(12) United States Patent
Schmit

(10) Patent No.: US 10,595,045 B2
(45) Date of Patent: Mar. 17, 2020

(54) DEVICE AND METHOD FOR COMPRESSING PANORAMIC VIDEO IMAGES

(71) Applicant: Advanced Micro Devices, Inc., Sunnyvale, CA (US)

(72) Inventor: Michael L. Schmit, Sunnyvale, CA (US)

(73) Assignee: ADVANCED MICRO DEVICES, INC., Sunnyvale, CA (US)

( * ) Notice: Subject to any disclaimer, the term of this patent is extended or adjusted under 35 U.S.C. 154(b) by 201 days.

(21) Appl. No.: 15/661,863

(22) Filed: Jul. 27, 2017

(65) Prior Publication Data

US 2019/0037240 A1    Jan. 31, 2019

(51) Int. Cl.
| | |
|---|---|
| *H04N 19/597* | (2014.01) |
| *G06T 3/00* | (2006.01) |
| *H04N 19/124* | (2014.01) |
| *H04N 19/139* | (2014.01) |
| *H04N 19/182* | (2014.01) |
| *H04N 19/57* | (2014.01) |

(52) U.S. Cl.
CPC ......... *H04N 19/597* (2014.11); *G06T 3/0093* (2013.01); *H04N 19/124* (2014.11); *H04N 19/139* (2014.11); *H04N 19/182* (2014.11); *H04N 19/57* (2014.11)

(58) Field of Classification Search
None
See application file for complete search history.

(56) References Cited

U.S. PATENT DOCUMENTS

| | | | |
|---|---|---|---|
| 2017/0118475 A1* | 4/2017 | Chang | H04N 19/56 |
| 2017/0214937 A1* | 7/2017 | Lin | H04N 19/56 |
| 2017/0251208 A1* | 8/2017 | Adsumilli | G06T 3/20 |
| 2018/0288356 A1* | 10/2018 | Ray | H04N 19/176 |

\* cited by examiner

*Primary Examiner* — Lindsay J Uhl
(74) *Attorney, Agent, or Firm* — Volpe and Koenig, P.C.

(57) ABSTRACT

A processing device is provided which includes memory configured to store data and a processor. The processor is configured to receive a plurality of panoramic video images representing views around a point in a three dimensional (3D) space and warp the plurality of panoramic video images, using a panoramic format, into a plurality of formatted warped images. The processor is also configured to store, in the memory, the plurality of formatted warped images and perform a motion search around each co-located pixel block of a reference panoramic frame by limiting the motion searches in a vertical direction around the co-located pixel blocks.

16 Claims, 7 Drawing Sheets

DEVICE AND METHOD FOR COMPRESSING PANORAMIC VIDEO IMAGES

BACKGROUND

Conventional video compression methods include motion-compensated prediction for reducing amounts of video data to encode by exploiting temporal correlations between successive frames in a video stream. Motion-compensated prediction includes determining, for each portion of pixels (e.g., block of pixels) of a current video frame being encoded, a similar block in a reference frame (e.g., a previously encoded frame, group of frames, or portion of a frame) to be used as a predictor to encode the portion of the current video frame being encoded. For each block of a current frame to be encoded, a search of a previously encoded portion of data is performed within a reference area (i.e., search window) around a co-located block in the reference frame.

Panoramic video includes the display of images representing views in multiple directions, such as for example, a full panoramic view of the sphere surrounding a point in three dimensional (3D) space (e.g., 360 degrees along the horizon and 180 degrees up and down) and a partial panoramic view (i.e., view of less than the full sphere in one or more directions). Video compression of panoramic video includes warping and storing the panoramic images using a panoramic format, such as a full spherical format (e.g., equirectangular format, cylindrical format and cube maps) in the case of full panoramic views or using a partial format (e.g., cylindrical format, arc format, rectilinear format and partial spherical format) in the case of partial panoramic views.

BRIEF DESCRIPTION OF THE DRAWINGS

A more detailed understanding can be had from the following description, given by way of example in conjunction with the accompanying drawings wherein.

DETAILED DESCRIPTION

Figure 1:
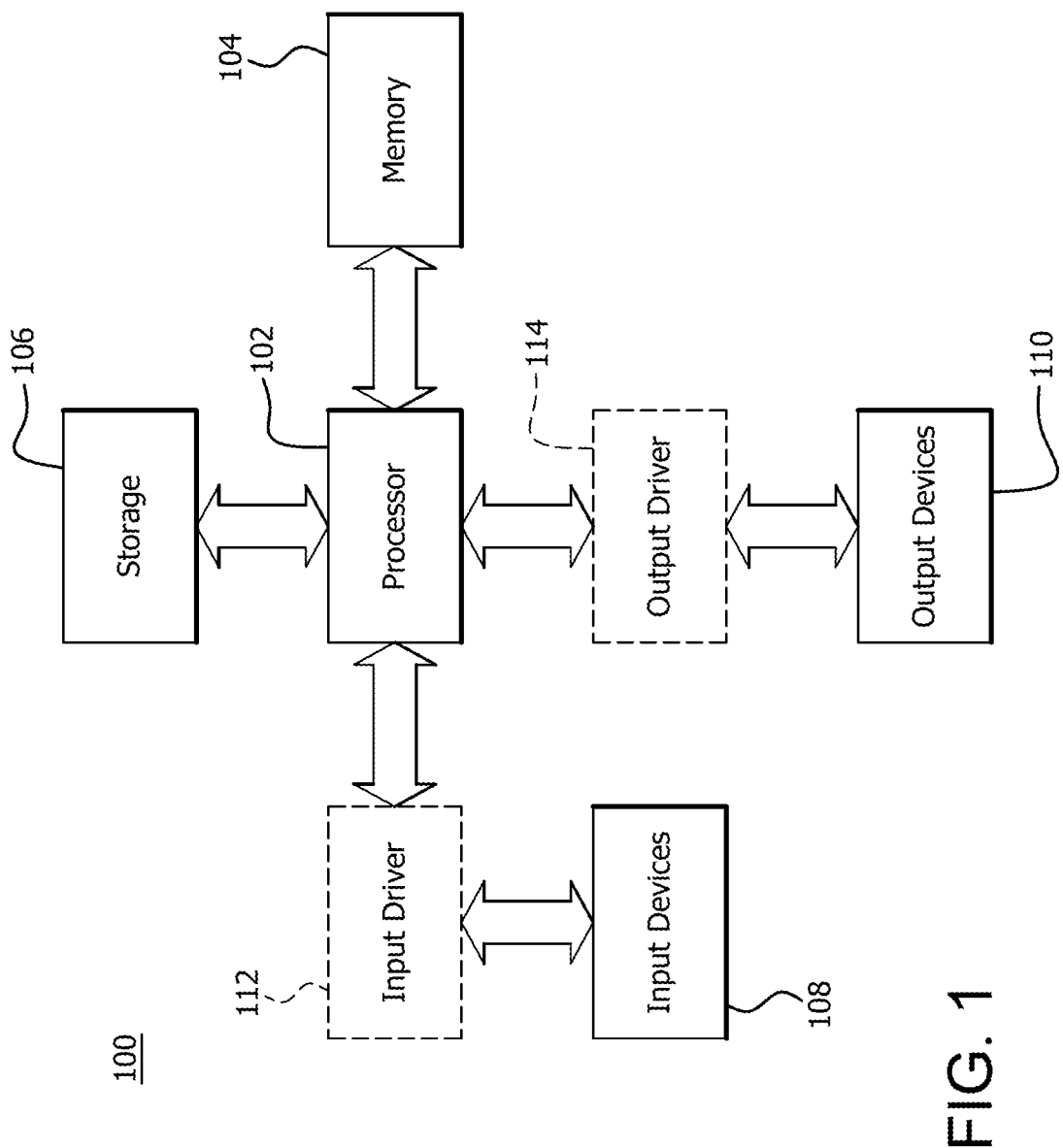
FIG. 1 is a block diagram of an example device in which one or more features of the disclosure can be implemented.

Accurate motion search results rely on frame portions (e.g., pixel blocks), each representing corresponding portions of the captured images, to have the same geometry (i.e., same shape). The shapes of pixel blocks stored in a panoramic format (e.g., equirectangular format) become more distorted (e.g., larger) however, as the pixel blocks move away from the equator in the equirectangular frame. For example, the square shape of pixel blocks at the equator of an equirectangular frame distort to a different shape (e.g., larger in the horizontal direction at the top of the shape than at the bottom of the shape) away from the equator. Accordingly, pixels closer to the north and south poles distort to a larger shape larger.

The information provided by these larger pixels are a less accurate representation of the image than the pixels closer to the equator and therefore, are less reliable for predicting similar blocks. In addition to being distorted relative to pixels at the equator, pixels also become increasingly distorted in the vertical direction relative to any other pixels in the equirectangular frame. Because of this distortion, motion search results become increasingly less reliable for pixels displaced in the vertical direction (e.g., directly vertical or diagonal) from co-located blocks in the equirectangular frame.

For each block of a current frame to be encoded, conventional motion search techniques search for a similar block in multiple directions (e.g., vertical, horizontal and diagonal) around a co-located block in a reference frame. Search windows used in conventional motion search techniques are typically set to have an aspect ratio of about 2 to 1 such that the encoder searches a number (e.g., 100) of pixels in the horizontal direction that is twice the number (e.g., 50) of pixels in the vertical direction from each co-located block. Although the search window is larger horizontally, the conventional techniques often spend time and expense (e.g., memory bandwidth) searching for pixels in the vertical and diagonal directions which produce unreliable motion compensation prediction results.

The present application describes devices and methods for compressing panoramic video images which skew the motion search around a co-located block according to direction by limiting the motion searches in a vertical direction, thereby allocating more processing time to prediction results in the horizontal direction. Alternatively, more weight is allocated to results of the motion searches in a horizontal direction than in a vertical direction from the co-located pixel blocks. In addition, the quantization parameter is changed to increase compression as the motion search proceeds away from the equator toward the north and south poles of the equirectangular frame.

A processing device is provided which includes memory configured to store data and a processor. The processor is configured to receive a plurality of panoramic video images representing views around a point in a three dimensional (3D) space and warp the plurality of panoramic video images, using a panoramic format, into a plurality of formatted warped images. The processor is also configured to store, in the memory, the plurality of warped images and perform a motion search around each co-located pixel block of a reference panoramic frame by limiting the motion searches in a vertical direction around the co-located pixel blocks.

A method of compressing panoramic video images is provided that includes receiving a plurality of panoramic video images representing views around a point in a three dimensional (3D) space. The method also includes warping the plurality of panoramic video images, using a panoramic format, into a plurality of formatted warped images and storing, in memory, the plurality of warped images. The method further includes performing a motion search around each co-located pixel block of a reference panoramic frame by limiting the motion searches in a vertical direction around the co-located pixel block.

A processing device is provided which includes memory configured to store data and a processor. The processor is configured to receive a plurality of panoramic video images representing views around a point in a three dimensional (3D) space and warp the plurality of panoramic video images, using a panoramic format, into a plurality of formatted warped images. The processor is also configured to store, in the memory, the plurality of warped images and perform motion searches around co-located pixel blocks of a reference panoramic frame by allocating more weight to results of the motion searches in a horizontal direction from the co-located pixel blocks than in a vertical direction from the co-located pixel blocks.

FIG. 1 is a block diagram of an example device 100 in which one or more features of the disclosure can be implemented. The device 100 can include, for example, a computer, a gaming device, a handheld device, a set-top box, a television, a mobile phone, or a tablet computer. The device 100 includes a processor 102, a memory 104, a storage 106, one or more input devices 108, and one or more output devices 110. The device 100 can also optionally include an input driver 112 and an output driver 114. It is understood that the device 100 can include additional components not shown in FIG. 1.

In various alternatives, the processor 102 includes a central processing unit (CPU), a graphics processing unit (GPU), a CPU and GPU located on the same die, or one or more processor cores, wherein each processor core can be a CPU or a GPU. In various alternatives, the memory 104 is be located on the same die as the processor 102, or is located separately from the processor 102. The memory 104 includes a volatile or non-volatile memory, for example, random access memory (RAM), dynamic RAM, or a cache.

The storage 106 includes a fixed or removable storage, for example, a hard disk drive, a solid state drive, an optical disk, or a flash drive. The input devices 108 include, without limitation, a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include, without limitation, a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present.

Figure 2:
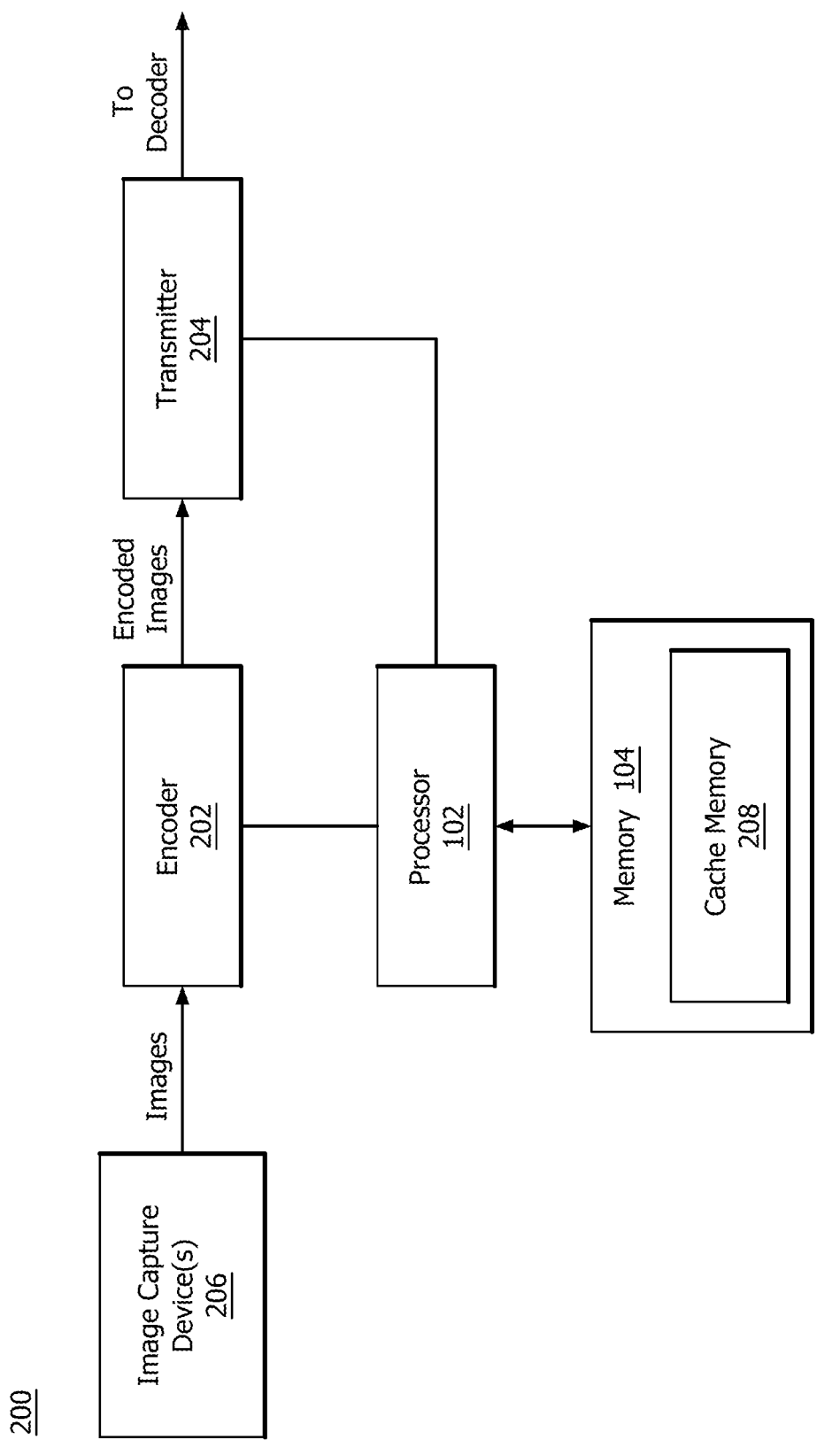
FIG. 2 is a block diagram illustrating exemplary components of a processing device in which one or more features of the disclosure can be implemented.

FIG. 2 is a block diagram illustrating exemplary components of a processing device 200 in which one or more features of the disclosure can be implemented. Processing device 200 is used to process and compress panoramic video images as described in more detail below. As shown in FIG. 2, processing apparatus 200 comprises processor 102, encoder 202 (e.g., a encoder), transmitter 204, one or more image capture devices 206 and memory 104.

As shown in FIG. 2, processor 102 is in communication with encoder 202, transmitter 204, and memory 104, which includes cache memory 208 local to encoder 202. Processor 102 is configured to control the encoder 202 for compression of panoramic video images according to features of the disclosure, as described in more detail below.

Encoder 202 is configured to receive panoramic images from one or more image capturing devices 206 (e.g., one or more cameras) and receive instructions from processor 102 to perform motion searching and encoding of the panoramic images. The encoder 202 is also configured to warp panoramic images according to one or more panoramic formats, such as full spherical format (e.g., equirectangular format and cubic format) and partial format (e.g., cylindrical format, arc format, rectilinear format and partial spherical format). The encoder 202 is also configured, for example, to provide audio-video (A/V) synchronization of received audio data and the received video data as well as format the video data into packets (e.g., IP packets) for transporting over a network.

Transmitter 204 is configured to provide the encoded panoramic images to be decoded by a decoder (not shown). The encoded panoramic images are sent, for example, via a network interface controller (NIC) over one or more networks (e.g., local area network), including wired (e.g., Ethernet) or wireless networks (e.g., via WiFi, Bluetooth, and other wireless standards). Alternatively, transmitter is configured to transmit the encoded video data to a decoder on the same processing apparatus 200 (e.g., via a local device bus).

Figure 3:
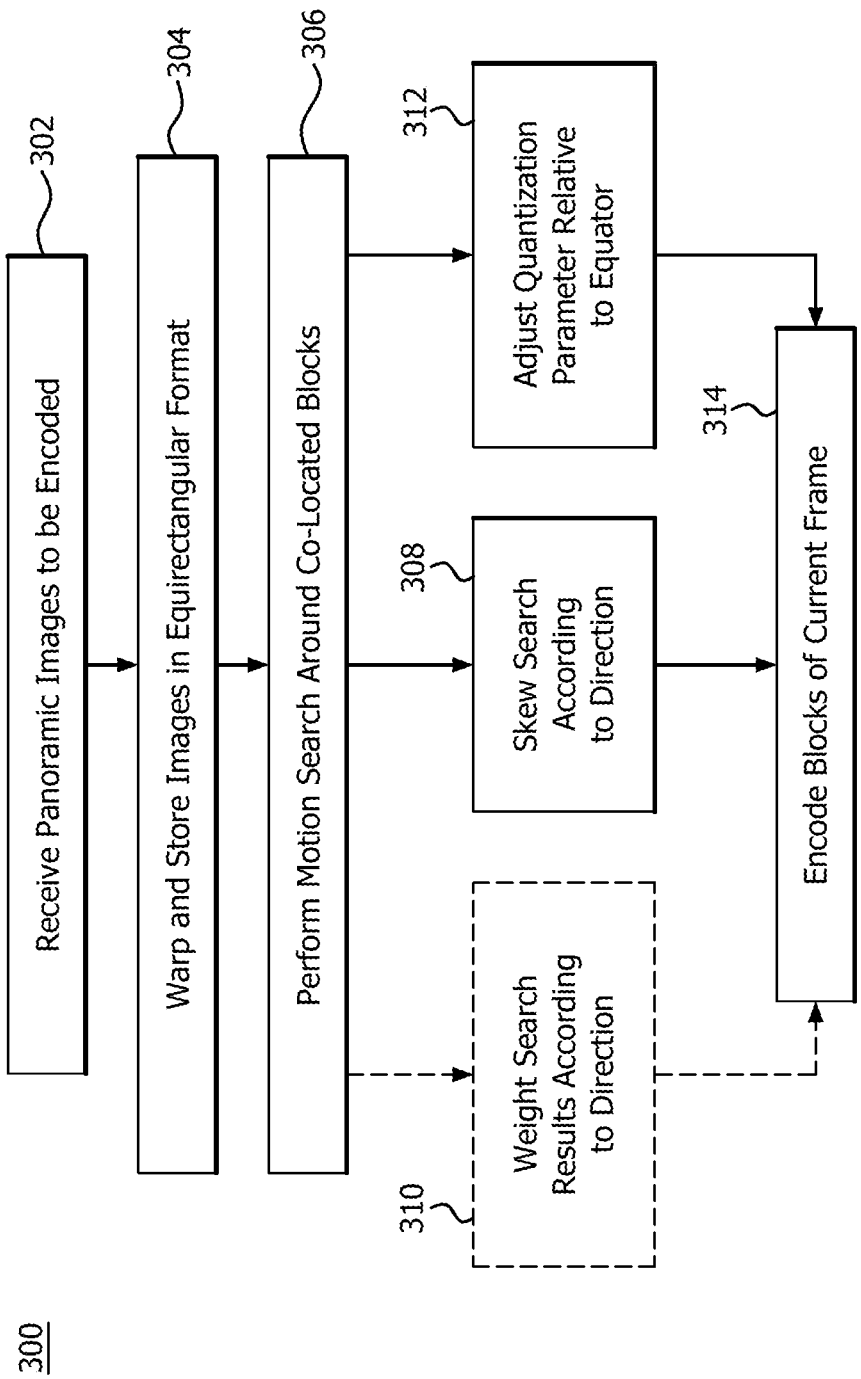
FIG. 3 is a flow diagram illustrating an exemplary method of compressing panoramic video images according to features of the disclosure.

FIG. 3 is a flow diagram illustrating an exemplary method 300 of compressing panoramic video images according to features of the disclosure. As shown at block 302, the method 300 includes receiving a plurality of panoramic video images representing views in multiple directions surrounding a point in three dimensional 3D space. The images, which are captured by one or more lenses, represent, for example, a full panoramic view (i.e., view of the sphere surrounding the point in 3D space, including 360 degrees along the horizon, 90 degrees up and 90 degrees down) or a partial panoramic view (i.e., view of less than the full sphere in one or more directions).

Images representing full panoramic views or partial panoramic views are stored using different panoramic formats. While images stored using these formats (e.g., equirectangular format, cylindrical format, arc format and partial spherical format) result in distortion of pixels in the vertical direction, for simplification purposes, the features of the disclosure are described with reference to images representing full panoramic views and stored according to an equirectangular format.

Figure 4A:
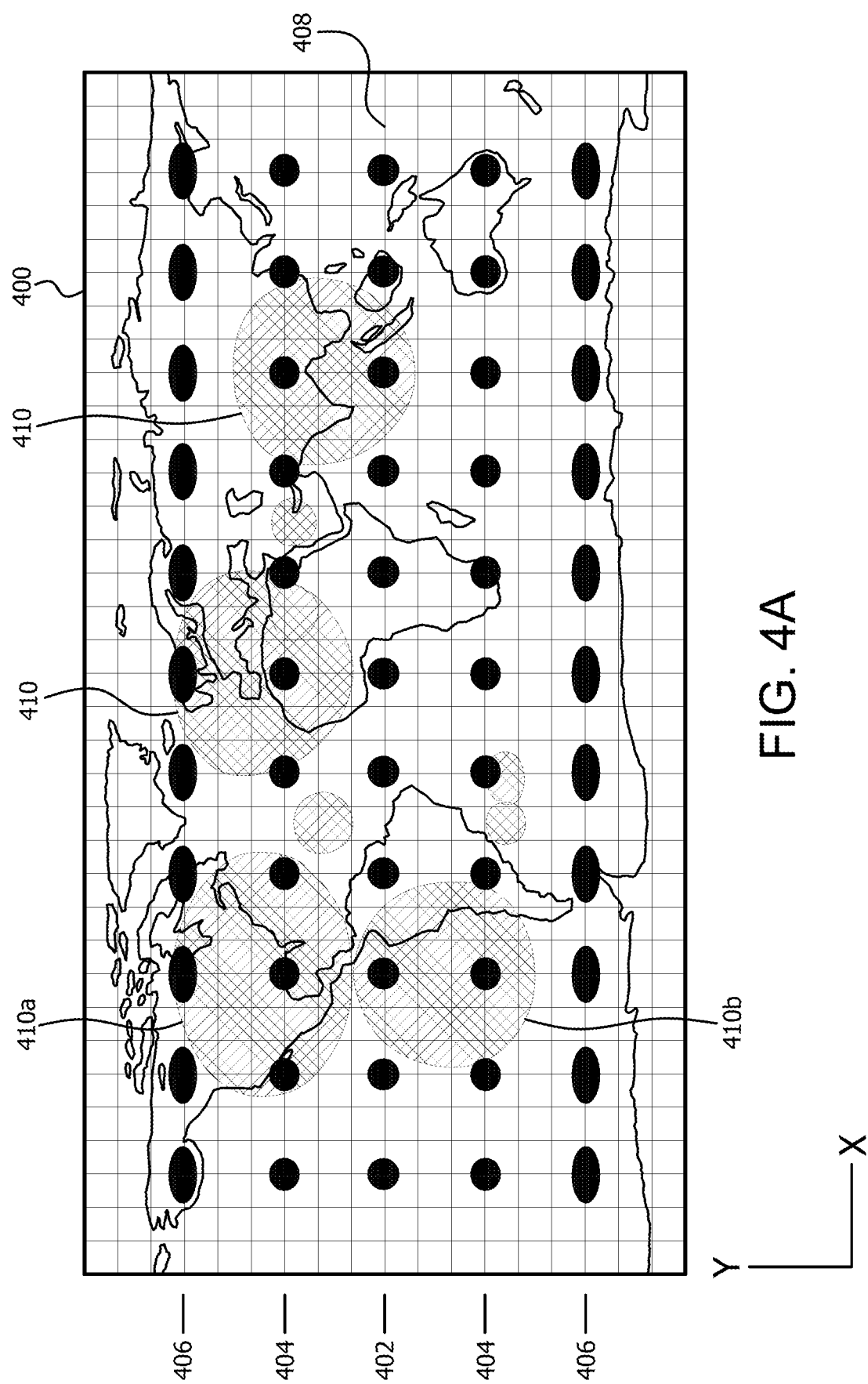
FIG. 4A is an equirectangular projection of a world map illustrating pixel distortion.
Figure 4B:
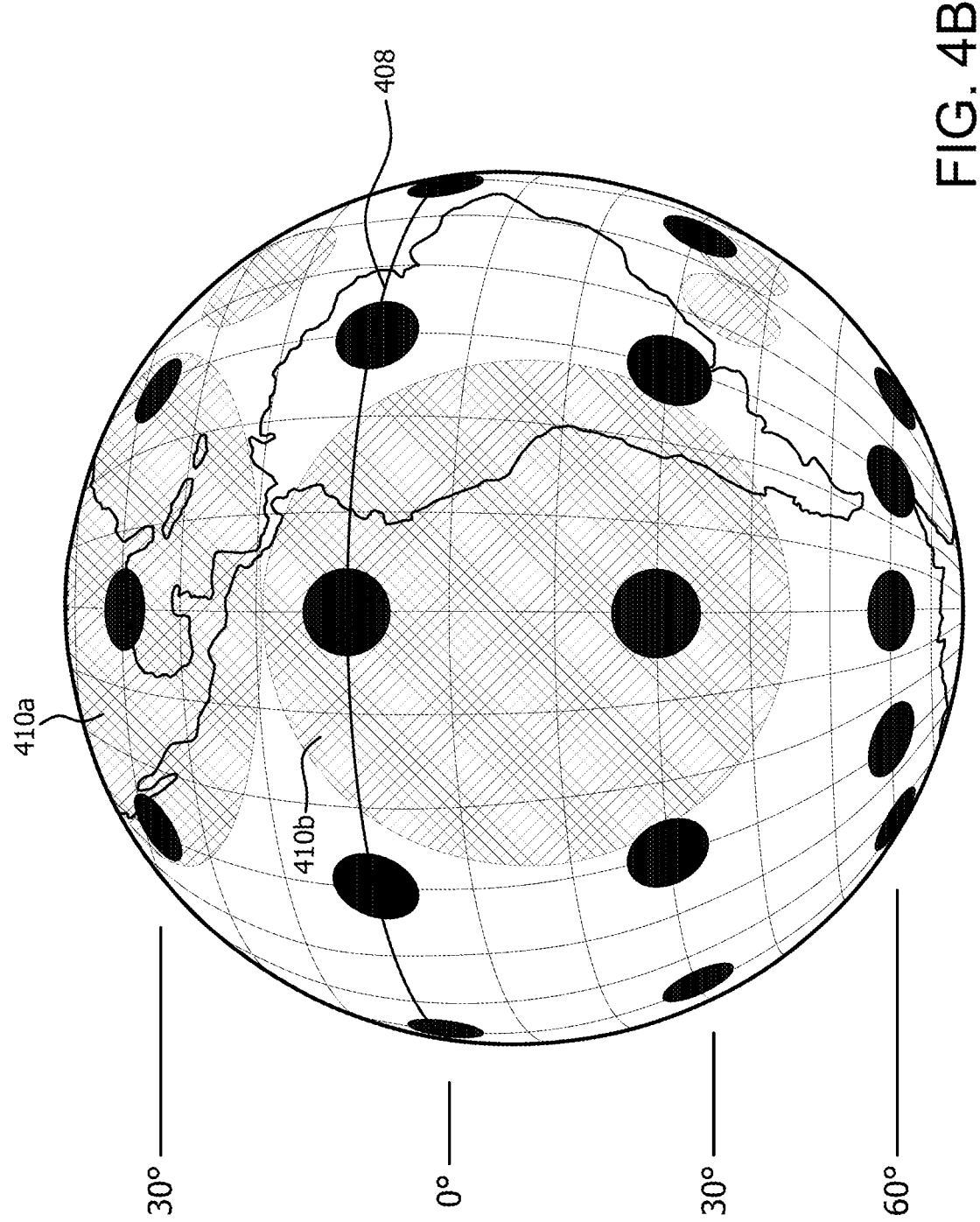
FIG. 4B is a spherical projection the world map shown in FIG. 4A.

As shown at block 304, the panoramic video images are warped and stored according to an equirectangular format. An equirectangular projection and spherical projection of a world map 400 are shown in FIG. 4A and FIG. 4B, respectively, to illustrate the relationship and differences between equirectangular projection and spherical projection. FIG. 4A is an equirectangular projection of the world map 400 illustrating pixel distortion as the pixels move away from the equator. FIG. 4B is a spherical projection (e.g., displayed in virtual reality (VR) headset) of a portion of the world map 400 shown in FIG. 4A. As described above, the shapes of pixel portions in the warped equirectangular frame become more distorted as the pixels move away from the equator in the equirectangular frame. The equirectangular projection of the world map 400 shown in FIG. 4 is, for example, a stitched image representing the panoramic spherical view (e.g., 360 degrees horizontally and 180 degrees vertically) as a 2×1 rectangle, where Cartesian X-Y coordinates on the equirectangular frame in FIG. 4A correspond to longitude and latitude points on the spherical projection in FIG. 4B.

The equirectangular frame shown at FIG. 4 includes equally spaced rows of pixel portions (i.e., row 404, row 406 and row 402 corresponding to equator 408) each being located along a different Y-coordinate. Each row 402, 404 and 406 includes the same number of pixel portions. Each pixel portion in a row is located at an X-coordinate and corresponds to other pixel portions vertically displaced at the same X-coordinate in another row.

As portions of a frame move away from the equator 408 in the vertical direction (i.e., the Y direction in FIG. 4A) of the equirectangular frame, the shape of the portions become enlarged and distorted. For example, a square portion (e.g., a 10×10 block of pixels as captured by a camera) distorts to a trapezoidal-type shape (e.g., approximately 7 pixels wide at the top, 10 pixels high and 8 pixels wide at the bottom) at 45 degrees away from the equator.

In another example, FIG. 4 illustrates how the shapes of portions away from the equator 408 are distorted compared to circular shaped portions at corresponding X-coordinates at the equator. As illustrated at FIG. 4, each portion in row 402 at the equator 408 is circular shaped, but the shapes of each portion in rows 404 (corresponding to 30 degrees latitude and −30 degrees latitude on the spherical projection) are distorted compared to the circular shaped portions in row 402 at the equator 408. In addition, the shape of each portion in rows 406 (corresponding to 60 degrees latitude and −60 degrees latitude on the spherical projection) are even more distorted compared to the circular shaped portions in row 402 at the equator 408. In contrast, the shapes of portions in the spherical projection shown in FIG. 4B are not distorted compared to the shapes of portions at the equator 408 at corresponding lines of longitude.

The distortion of portions in the equirectangular frame is further illustrated by the larger shaped portions 410 shown in FIGS. 4A and 4B. The two larger shaped portions 410a and 410b in FIG. 4B correspond to the two larger shaped portions 410a and 410b, respectively, on the left side of FIG. 4A. As shown in the spherical projection at FIG. 4B, both larger shaped portion 410a and larger shaped portion 410b are circular shaped. In the equirectangular frame shown in FIG. 4A, however, the larger shaped portion 410a and 410b are not circular shaped. Further, the larger shaped portion 410a, which lies further from the equator 408 than larger shaped portion 410b, is more distorted than the larger shaped portion 410b.

Referring back to FIG. 3, as shown at block 306, motion compensation prediction (i.e., motion searching) is performed for the images stored in the equirectangular format by searching, for each portion (e.g., block) of pixels in the current equirectangular frame to be encoded, around a co-located block in a reference frame (e.g., a previously encoded P-frame) for a similar block to be used as a predictor to encode each block of pixels in the current equirectangular frame. The search around each co-located block in the reference frame is performed within a reference area (i.e., search window).

As shown at block 308, the method 300 includes skewing the motion search around each co-located block according to direction. That is, the motion search is limited, via processor 102, in a vertical direction around the co-located blocks. The size of the search area around each co-located block of a frame is typically limited to reduce the search time, reduce the power consumed to retrieve previously encoded data from non-local memory for each search and the size of local memory (i.e., preserve silicon area) used to store the previously encoded data for each search. Search areas typically have an aspect ratio of about 2 to 1 such that an encoder searches an area around a co-located block in which the number (e.g., 100) of pixels searched in the horizontal direction is about twice the number (e.g., 50) of pixels searched in the vertical direction.

Because pixels in equirectangular space become increasingly more distorted in the vertical direction, however, the aspect ratio of the search area is determined, via processor 102, as a function of the number of pixels of distortion in the width of the search range. Reliable search results are, for example, provided when a portion being searched (e.g., around a square co-located block 16.0 pixels wide and 16.0 pixels high at the equator) is distorted from the square co-located block to a shape in which there is a pixel distortion equal to or less than 1.0 pixel in width from the top of the shape to the bottom of the shape (e.g., between 15.0 to 16.0 pixels wide at the top, 16.0 pixels high and 16.0 pixels wide at the bottom if the search is in the vertical direction to the north).

The search parameter (e.g., measured in degrees or pixels) in the vertical direction from a co-located block) is determined, via processor 102, for example, as a function of the cosine of the change in width (e.g., pixel width) from the co-located block to the distal edge (e.g., north edge if the search is a north direction or south edge if the search is a south direction) of the search area. The search parameter (e.g., measured in pixels) in the horizontal direction (i.e., left and right) is any value, such as for example, a value based on cache size, a value (e.g., predetermined value) based on encoder designs and encoder restriction.

The search parameter in the vertical direction is, for example, determined according to a pixel accuracy range (e.g., a pixel accuracy range of a codec). For example, codecs typically allow, for motion vectors, a pixel accuracy range between about a half of a pixel to about a quarter of a pixel. To produce search results within this pixel accuracy range, the search parameter in the vertical direction comprises a search parameter range from about 5 degrees latitude in the vertical direction to about 10 degrees latitude in the vertical direction.

For example, if an image in equirectangular space is 4000 pixels in width by 2000 pixels (i.e., 180 degrees) in height, then search results within this pixel accuracy range are produced when the search parameter is set such that the search in the vertical direction from the co-located block searches between about 112 pixels (i.e., about 10 degrees and 56 pixels (i.e. about 5 degrees). That is, the processor 102 is configured to limit the search in the vertical direction according to degrees, and alternatively, by a search parameter that is less than or equal to a predetermined number of pixels (e.g., less than or equal to any number of pixels between 112 pixels 56 pixels) when pixel dimensions (e.g., 4000 pixels by 2000 pixels) of an equirectangular frame are known.

A single search parameter in the vertical direction is determined for each portion of the equirectangular frame. Alternatively, different search parameters in the vertical direction are determined for different portions of the equirectangular frame. For example, because portions of the frame at or close to the north and south poles become distorted to a degree such that the search results are virtually meaningless (e.g., when a single pixel at the north pole or south pole is stretched across the width of the image), the search parameters in the vertical direction at these portions are set, for example, to less than 5 degrees or even zero degrees (i.e., no vertical search).

Figure 5B:
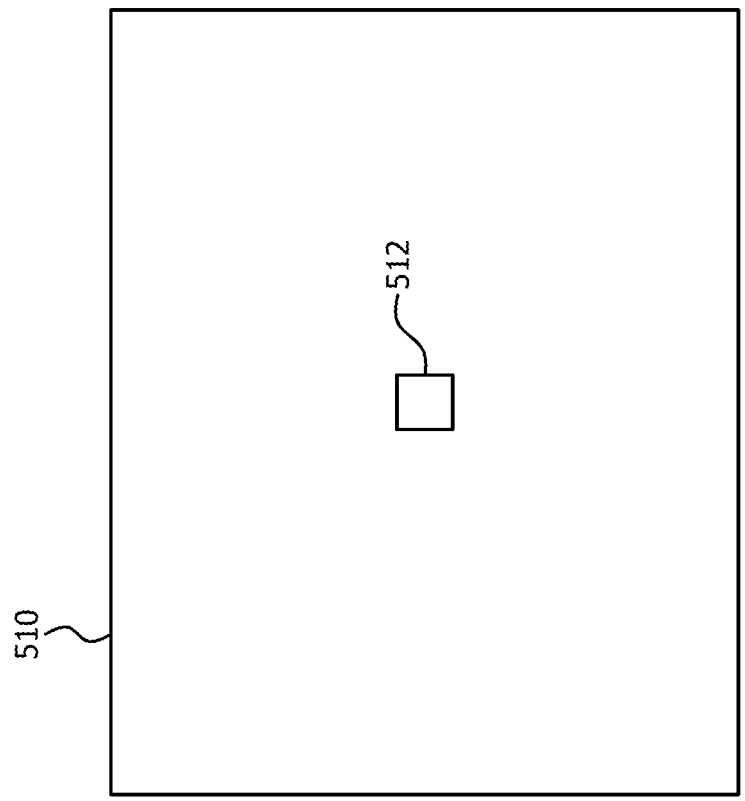
FIG. 5B is an illustration of a current frame comprising a current block to be decoded.
Figure 5A:
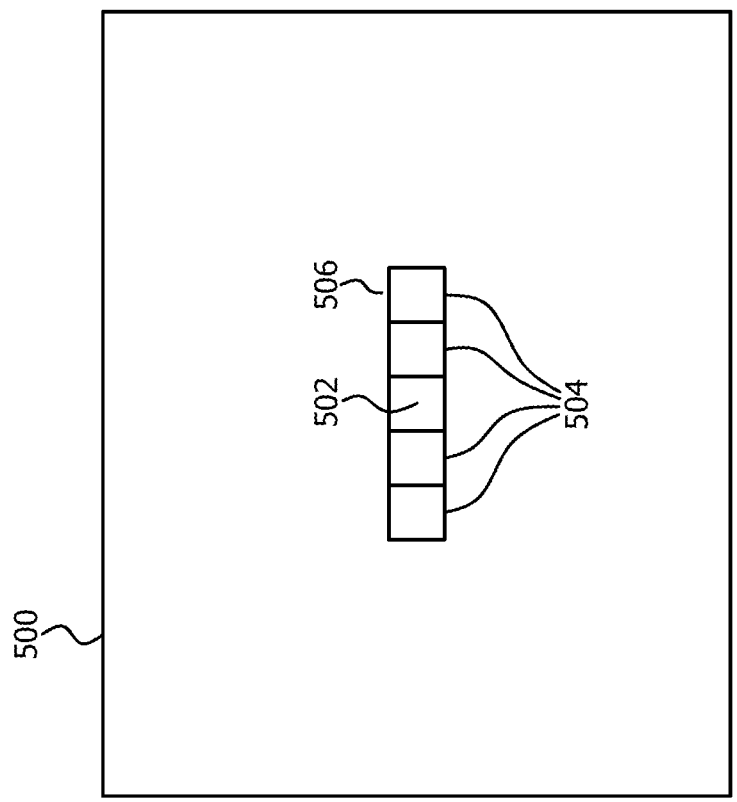
FIG. 5A is an illustration of a reference frame in equirectangular space comprising an example search window used to limit motion searching in the vertical direction.

FIG. 5A is an illustration of a reference frame 500 in equirectangular space comprising an exemplary search window 506 having a 5 to 1 aspect ratio for limit searching in the vertical direction V around co-located blocks of the reference frame 500. FIG. 5B is an illustration of a current frame 510 comprising current block 512 to be decoded. While FIG. 5A and FIG. 5B illustrate a search window 506 around co-located block 502, having a location corresponding to the location of block 512 of the current frame 510 shown in FIG. 5B, it is understood that the motion search process is configured to move (e.g., slide) the search window 506 across each of the blocks of the reference frame 500, including co-located block 502, to search for prediction blocks (i.e., similar to each block (e.g., block 512) to be encoded in the current frame 510) around each of the blocks (including co-located block 502) of the reference frame 500.

As shown in FIG. 5A, the search window 506 includes co-located block 502 and adjacent blocks 504 located in a horizontal direction H from the co-located block 502. The search window has a 5 to 1 aspect ratio (5 blocks in the horizontal direction H to 1 block in the vertical direction V). That is, the search window 506 comprises 5 blocks (i.e., the co-located block 502 and two adjacent blocks 504 to each side of the co-located block 502) in the horizontal direction H and 1 block in the vertical direction V (i.e., the co-located block 502) without searching for any blocks adjacent to the co-located block 502 in the vertical direction V. The 5×1 search window 506 results, for example, from a search parameter determined as a function of the cosine of the change in pixel width from a co-located block (e.g., co-located block 502) to the distal edge of the search area, such as a search parameter ranging between about 5 degrees to about 10 degrees in the vertical direction. The configuration (e.g., size and shape) of the search window 506 in the horizontal direction H and the vertical direction V shown in FIG. 5A and FIG. 5B is, however, merely exemplary.

Referring back to FIG. 3, alternative to skewing the motion search results at block 308, the skewed search is bi-passed and the search results are weighted according to direction as indicated in phantom at block 310. For example, some hardware encoders include circuitry controlled to have a predetermined buffer size (e.g., in cache memory 208 shown in FIG. 2) allocated for a search window.

Figure 6B:
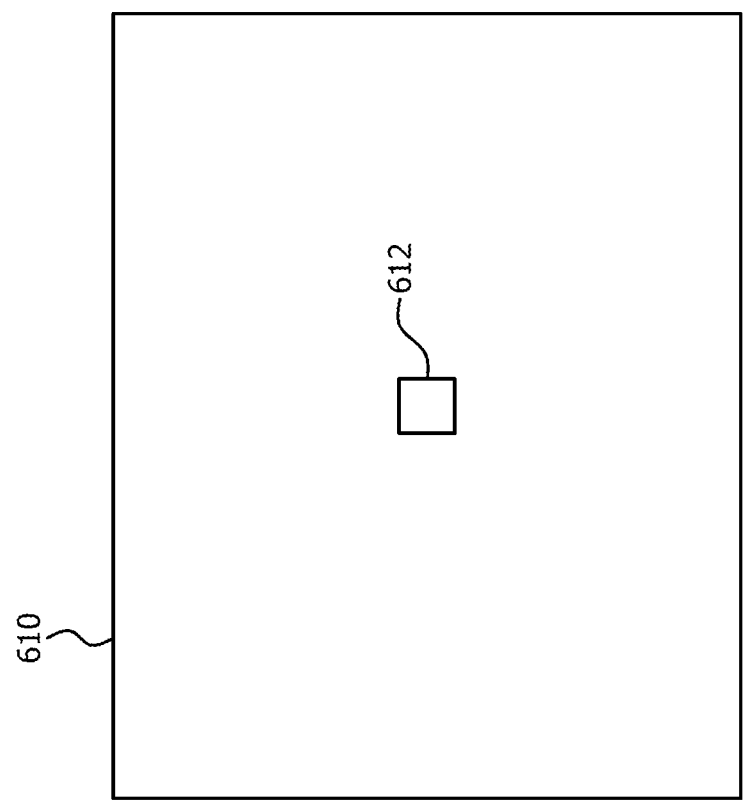
FIG. 6B is an illustration of a current frame comprising a current block to be decoded.
Figure 6A:
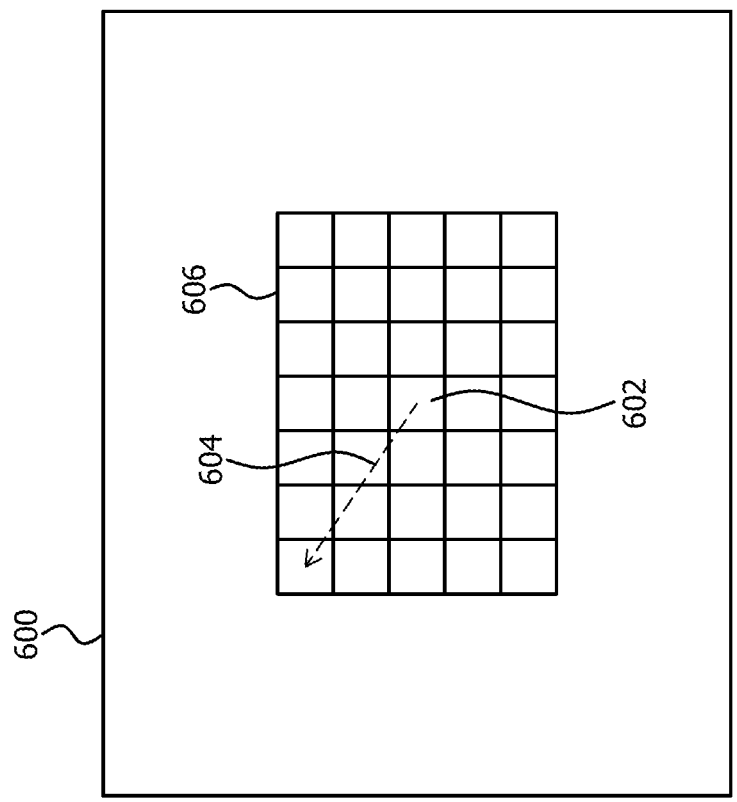
FIG. 6A is an illustration of a reference frame in equirectangular space comprising a co-located block, a predicted motion vector, a search window and a search range used in motion compensation prediction.

For example, FIG. 6A is an illustration of an exemplary reference frame 600 comprising a co-located block 602, a predicted motion vector 604 and a search window 606 to which a predetermined buffer size is allocated. FIG. 6B is an illustration of current frame 610 comprising current block 612 to be decoded.

As shown in FIG. 6A, motion searching is performed using the predetermined search window having a 7 to 5 aspect ratio (7 blocks in the horizontal direction H to 5 block in the vertical direction V). In this case, motion searching is performed using the predetermined search window 606, but less weight is given to motion searching that results from motion vector 604 indicating motion equal to or greater than a predetermined threshold distance (e.g., number of pixels) from a co-located block in the vertical direction.

For example, motion vector 604 in FIG. 6A indicates motion that is about 2 blocks in the vertical direction V and about 3 blocks in the horizontal direction H from co-located block 602. In this example, a threshold distance in the vertical direction V is predetermined to be 1 pixel block. Therefore, processor 102 compares the distance from the co-located block 602 to each block in the search window 606 in the vertical direction V. When a searched block is equal to or greater than the threshold distance of one block in the vertical direction, processor 102 allocates less weight to the search results of the searched block. Accordingly, processor 102 determines that the top and bottom rows of pixel blocks in the search window 606 are equal to or greater than the threshold distance and controls encoder 202 such that top and bottom rows of pixel blocks are encoded with less compression than the 3 rows of pixel blocks in the middle of search window 606. The compute time is, therefore, focused on encoding the blocks resulting from the horizontal searching and other compression techniques.

In addition to skewing the search at block 308 or weighting the search results at block 310, a quantization parameter (QP) is, for example, adjusted as the motion search pattern moves from one co-located block to the next relative to the equator (e.g., 408 in FIG. 4A) in the equirectangular frame, as shown at block 312. The QP is increased for example, at even intervals (e.g., per each row, per a plurality of rows). Alternatively, the QP is increased at uneven intervals (e.g., once every 10 rows for a predetermined number of rows, such as until 100 rows from the equator is reached, then once every 5 rows for a predetermined number of rows).

During the video compression process, a block of residual samples are transformed to provide a set of weighted values (i.e., coefficients) for a basis pattern. Weighted basis patterns are combined to re-create the block. The transform coefficients are quantized according to a QP. A higher QP results in higher compression and less compute time at the expense of poor decoded image quality. A lower QP results in lower compression and better decoded image quality at the expense of more compute time.

As shown at block 314 of FIG. 3, the blocks in the current frame 510 are then encoded based on the skewed motion search results from block 308, or alternatively, on the weighted search results from block 310. Also, if the QP adjustment is performed at block 312, the blocks in the current frame 510 are also encoded based on the adjusted QP parameters.

As described above, pixels in the warped equirectangular frame become more distorted as the pixels move away from the equator of the equirectangular frame. Accordingly, because the prediction results (i.e., blocks predicted to be similar to the blocks to be encoded in the current frame) are less reliable as the distance from the equator increases, the processor 102 controls the encoder 202 to encode the pixels in the current frame with an increasingly larger QP as the distance (e.g., in pixels) from the equator increases in the current frame, resulting in higher compression and less compute time. That is, the image quality is likely to be poor even if these more distant pixels are compressed less because of their distortion. Therefore, increasing the QP as the distance from the equator increases saves compute time without affecting the overall image quality.

It should be understood that many variations are possible based on the disclosure herein. Although features and elements are described above in particular combinations, each feature or element can be used alone without the other features and elements or in various combinations with or without other features and elements.

The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements features of the disclosure.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A processing device comprising:
memory configured to store data; and
a processor configured to:
   receive a plurality of panoramic video images representing views around a point in three dimensional (3D) space;
   warp the plurality of panoramic video images, using a panoramic format, into a plurality of formatted warped images;
   store, in the memory, the plurality of warped images; and
   perform a motion search around each co-located pixel block of a reference panoramic frame by limiting the motion searches in a vertical direction around the co-located pixel blocks by a search parameter in the vertical direction from each co-located pixel block determined as a function of a cosine of a change in pixel width from each co-located block to a distal edge of a search area around each co-located block.

2. The processing device according to claim 1, wherein,
the reference panoramic frame comprises an equator extending across the reference panoramic frame at 0 degrees latitude in a horizontal direction and a plurality of pixels extending in the vertical direction between 0 degrees at the equator and 180 degrees at a north pole and between 0 degrees at the equator and 180 degrees at a south pole, and
the search parameter in the vertical direction comprises a search parameter range from about 5 degrees in the vertical direction to about 10 degrees in the vertical direction.

3. The processing device according to claim 1 wherein the processor is further configured to limit the motion searches in the vertical direction around the co-located blocks according to a pixel accuracy range.

4. The processing device according to claim 1, wherein the processor is further configured to limit the motion searches in the vertical direction around the co-located blocks to less than or equal to a predetermined number of pixels.

5. The processing device according to claim 1, wherein the plurality of panoramic video images represent a full panoramic view or a partial panoramic view.

6. The processing device according to claim 1, wherein the processor is further configured to warp the plurality of panoramic video images using an equirectangular format.

7. The processing device according to claim 1, wherein the processor is further configured to encode pixels in a current frame by adjusting a quantization parameter (QP) relative to a distance in the vertical direction from an equator of the current frame to the pixels being encoded.

8. The processing device according to claim 7, wherein the processor is further configured to encode the pixels in the current frame by increasing the QP as the distance in the vertical direction also increases from the equator to the pixels being encoded, wherein a higher QP results in higher compression of the pixels in the current frame.

9. The processing device according to claim 1, further comprising an encoder, and
the processor is further configured to control the encoder to perform the motion search around the co-located pixel blocks of the reference frame.

10. A method of compressing panoramic video images comprising:
receiving a plurality of panoramic video images representing views around a point in three dimensional (3D) space;
warping the plurality of panoramic video images, using a panoramic format, into a plurality of formatted warped images;
storing, in memory, the plurality of warped images; and
performing a motion search around each co-located pixel block of a reference panoramic frame by limiting the motion searches in a vertical direction around the co-located pixel block by a search parameter in the vertical direction from each co-located pixel block determined as a function of a cosine of a change in pixel width from each co-located block to a distal edge of a search area around each co-located block.

11. The method according to claim 10, wherein, the reference panoramic frame comprises an equator extending across the reference panoramic frame at 0 degrees latitude in a horizontal direction and a plurality of pixels extending in the vertical direction between 0 degrees at the equator and 180degrees at a north pole and between 0 degrees at the equator and 180 degrees at a south pole, and
the search parameter in the vertical direction comprises a search parameter range from about 5 degrees in the vertical direction to about 10 degrees in the vertical direction.

12. The method according to claim 10, further comprising limiting the motion searches in the vertical direction around the co-located blocks according to a pixel accuracy range.

13. The method according to claim 10, further comprising limiting the motion searches in the vertical direction around the co-located blocks to less than or equal to a predetermined number of pixels.

14. The method according to claim 10, further comprising limiting the motion search around the co-located blocks in the vertical direction to less than or equal to a predetermined number of pixels.

15. The method according to claim 10, further comprising encoding pixels in a current frame by adjusting a quantization parameter (QP) relative to a distance in the vertical direction from an equator of the current frame to the pixels being encoded.

16. The method according to claim 15, further comprising encoding the pixels in the current frame by increasing the QP as the distance in the vertical direction also increases from the equator to the pixels being encoded, wherein a higher QP results in higher compression of the pixels in the current frame.

* * * * *